United States Patent Office 2,801,858
Patented Aug. 6, 1957

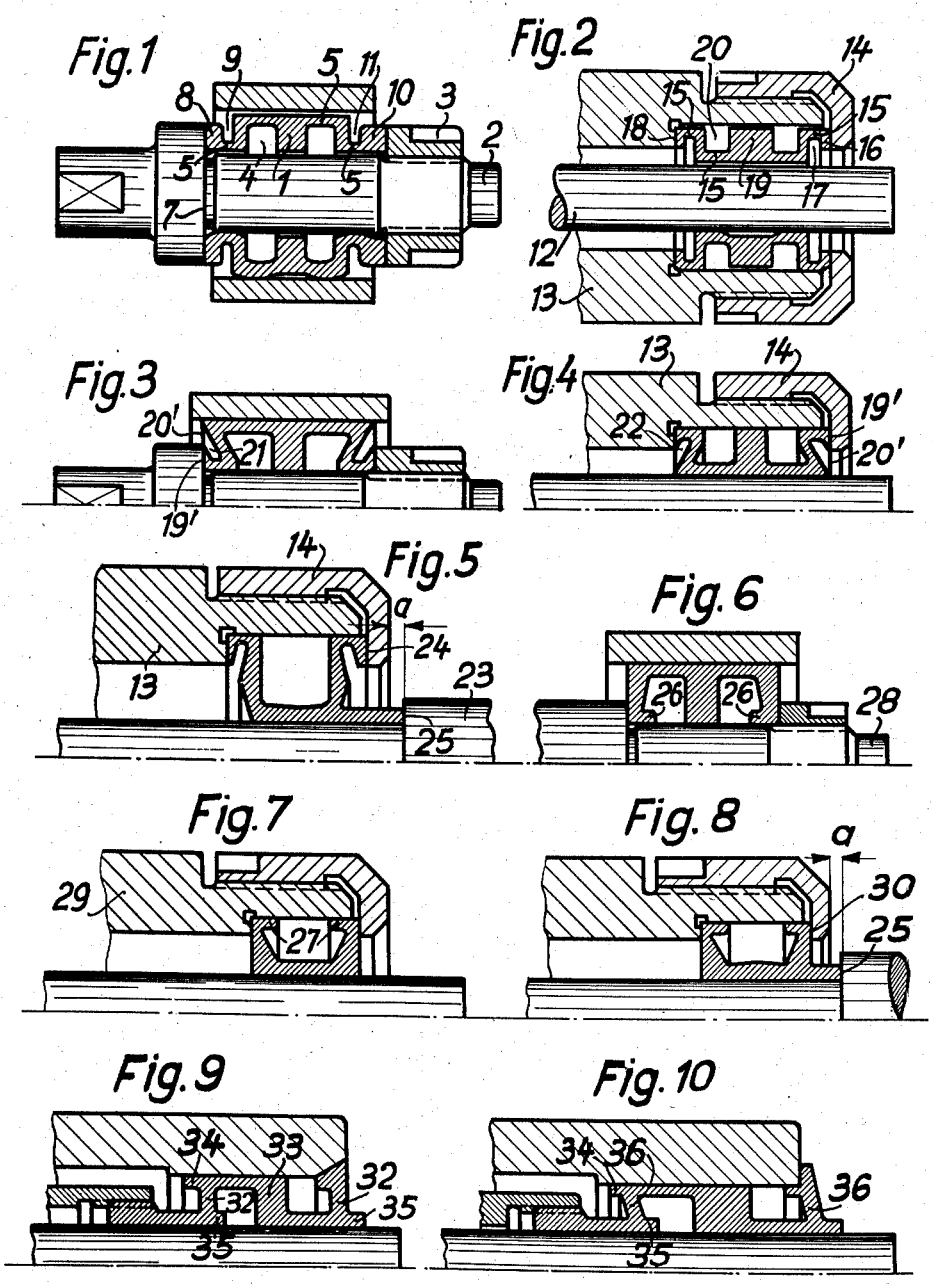

2,801,858

RESILIENT CHUCK

Rudolf Spieth, Esslingen-Kennenburg, Germany

Application May 23, 1955, Serial No. 510,340
In Germany October 22, 1948

Public Law 619, August 23, 1954
Patent expires October 22, 1968

7 Claims. (Cl. 279—2)

This invention relates to a work locating fixture of the kind, in which a box having a spring action both in axial and radial direction is organized to be shifted towards and away from a cylindrical work piece, being for instance arranged for sliding movement on a spindle. This box comprises elastically adjustable parts or links formed by radial indentures provided in its body. An adjusting nut acting on the box in axial direction presses the box against a stationary abutment. The box is carried into tightening position thereby that the faces of the tightening nut on the abutment and the box themselves are widened in radial direction and made thicker than the wall thickness of the links provided in the box, so that they are applied against the pressure face of the nut and the spindle with the correspondingly thicker annular face.

By this arrangement of the coacting parts the box is effectively retained in position, both in radial and axial direction, and the gripping effect is increased. At the same time the ends of the box are braced on the spindle or mandrel with particular strength by means of another annular groove provided in the box near its two end faces or near its circumference, so that links can be formed also at both ends of the box which correspondingly increase its elasticity and spring effect.

If desired, the radial end faces of the box may extend along the entire annular section and the open shanks of the groove section may be widened in the axial direction in order to obtain in this case also the widest possible supporting face.

This arrangement offers a particularly smooth tightening effect and therefore is particularly advantageous, also as regards the mandrel and the work itself in the case of clamping bushes acted upon by a tensile effort.

If the workpiece is gripped from the outside by means of a hollow mandrel, it may be useful to arrange the pressure surface of the box somewhat to the rear of the workpiece so that on clamping the workpiece between the outer annular face of the adjusting nut and the pressure face of the workpiece a gap is formed which enables the workpiece to be operated on without being hindered by the clamping device.

In the drawings affixed to this specification and forming part thereof several embodiments of gripping appliances according to this invention are illustrated schematically along axial sections by way of example.

Referring to the drawing, Figure 1 illustraes a gripping appliance in which 1 is the box, while 2 is a mandrel and 3 is the tightening nut which exerts pressure on the box 1, whereby the radial width of the box is increased towards the outside and the inside. By the indentures 4 and grooves 9 and 11 links 5 are formed and they allow the box to be transformed by pressure, that the workpiece is tightly gripped. The left-hand end of the clamping box abuts against the face 7 formed on the mandrel. The section 8 is wider so that a good contact is established between the adjoining faces. In a similar manner the abutting faces of the tightening nut 3 are thicker.

Figure 2 illustrates a similar arrangement, in which the workpiece 12 is gripped and tightened from the outside. 13 is a flying hollow mandrel. 14 is the clamping nut, 19 is the box with annular faces 16 which are widened towards the inside. Behind these faces notches 16 extend from the inside and notches 17 from the outside. Other notches 20 extend towards the inside in such a manner that flexible links 15 are formed. 18 is the supporting face on the hollow mandrel.

Figures 3 and 4 also illustrate clamping boxes for the clamping of the workpiece from the inside and the outside. Here the pressure faces 19' and the faces 20' where the workpiece abuts against the box, extend in the same radial plane. The notches 21 and 22 extend at an angle to the axes. Boxes of this kind may be very short and present a very high elasticity at the links.

The form of the clamping appliance according to Fig. 5 is particularly adapted for the working of a workpiece provided with an extension. Here the pressure face 24 of the work is located to the rear of the adjoining face 25 of the workpiece so far that a gap $a$ is formed between the outer ring face of the tightening nut 14 and the workpiece.

In order to avoid the danger of the notches and indentions being clogged by dirt, the pressure faces may also extend across the entire surface of the box as shown in Fig. 6 for the gripping of the workpiece from within and in Fig. 7 for the gripping from without.

The abutting faces 26 and 27 of the box which are applied to the mandrel at 28 and 29, respectively, are widened towards the inside, whereby a strong grip and a favourable elasticity are guaranteed.

A similar appliance is illustrated in Figure 8, in which the pressure face 30 of the box is arranged to the rear of the supporting face of the workpiece 23.

While the devices hitherto described are organized for pressure acting on the tightening appliance, Figs. 9 and 10 serve for clamping the workpiece by tensile stress.

In the embodiment of Fig. 9 the outer faces of the box 33 extend in radial direction by annular extensions 34 and 35, respectively, which enable the clamping to be effected in a particularly smooth manner. Similar faces 34 and 35 extending at an angle to the axis are provided in the device shown in Fig. 10.

I wish it to be understood that I do not desire to be limited to the details shown in the drawings and described in the foregoing specification, for obvious modifications will occur to a person skilled in the art.

I claim:

1. An axially and radially resilient chuck adapted for insertion between an abutment and a tightening nut on the mandrel, for firmly gripping a workpiece to be worked while on the mandrel, comprising a box, substantially radial recesses in said box whereby to form continuous cylindrical peripheral faces on the inside and outside of said box, substantially radial, annular hinged link portions disposed between said recesses and adapted to be deformed in cup-fashion on axial compression of the box, substantially axial hinge portions disposed between said links and adapted to bend inwardly and outwardly on axial compression of the box, the hinged link portions disposed at the two ends of the box having radial pressure faces adapted to abut against said abutment and said tightening nut, respectively, and being radially enlarged beyond the wall thickness of said hinge portions.

2. The chuck according to claim 1, comprising in addition to at least one recess and the adjoining link and hinge portions, notches disposed to the rear of the end portions, and additional hinge portions formed by said notches.

3. The chuck according to claim 1, wherein the end portions extend over the entire annular width of the box.

4. The chuck according to claim 1, comprising work supporting faces disposed in the same radial planes as the pressure faces on the end portions.

5. The chuck according to claim 1, comprising work supporting faces disposed in radial planes parallel to, but axially spaced from those of the pressure faces whereby to space the radial plane of the work supporting face, from the outside annular face of the tightening nut.

6. The chuck according to claim 1, wherein the recesses are formed in one of the inside and outside cylindrical surfaces of the box.

7. The chuck according to claim 1, wherein the link portions adjoining the recesses are enlarged toward the interior of the recesses whereby to increase the mandrel supported portion of the box.

References Cited in the file of this patent

UNITED STATES PATENTS

| | | |
|---|---|---|
| 2,612,376 | Wollner | Sept. 30, 1952 |
| 2,626,811 | Hohwart et al. | Jan. 27, 1953 |

FOREIGN PATENTS

| | | |
|---|---|---|
| 828,627 | Germany | Jan. 21, 1952 |